US006486319B1

(12) United States Patent
Böhm et al.

(10) Patent No.: US 6,486,319 B1
(45) Date of Patent: Nov. 26, 2002

(54) THERMOCHROMIC RYLENE DYES

(75) Inventors: Arno Böhm, Mannheim (DE); Heinrich Schmeisser, Ketsch (DE); Stefan Becker, Mainz (DE); Klaus Müllen, Köln (DE)

(73) Assignees: BASF Aktiengesellschaft, Ludwigshafen (DE); Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 0 days.

(21) Appl. No.: 10/069,563

(22) PCT Filed: Aug. 16, 2000

(86) PCT No.: PCT/EP00/07985

§ 371 (c)(1),
(2), (4) Date: Feb. 27, 2002

(87) PCT Pub. No.: WO01/16109

PCT Pub. Date: Mar. 8, 2001

(30) Foreign Application Priority Data

Aug. 27, 1999 (DE) .......................... 199 40 708

(51) Int. Cl.[7] .............................. C09B 5/62; C07D 22/18
(52) U.S. Cl. .......................... 546/38; 546/100; 524/89; 524/90
(58) Field of Search ..................... 546/38, 100; 524/89, 524/90

(56) References Cited

U.S. PATENT DOCUMENTS 4,172,202 A * 10/1979 Papenfuhs .................. 546/100
5,650,513 A * 7/1997 Langhals et al. ............. 546/38

FOREIGN PATENT DOCUMENTS

| EP | 0 596 292 | 5/1994 |
| EP | 0 657 436 | 6/1995 |
| WO | 96 22331 | 7/1996 |
| WO | 96 22332 | 7/1996 |
| WO | 97 22607 | 6/1997 |

OTHER PUBLICATIONS

Nagao et al., "Synthesis and Properties of N–Alkylbromoperylene–3,4–dicarboximides", Dyes and Pigments, 16, 1991, 19–25.*

* cited by examiner

Primary Examiner—Fiona T. Powers
(74) Attorney, Agent, or Firm—Oblon, Spivak, McClelland, Maier & Neustadt, P.C.

(57) ABSTRACT

The invention relates to rylene dyes of the general formula (I), wherein the variables have the following meanings: R represents hydrogen; optionally substituted $C_1$–$C_{30}$ alkyl-$C_5$–$C_8$-cycloalkyl, aryl or hetaryl; R' represents optionally substituted $C_2$–$C_{30}$ alkyl or $C_5$–$C_8$ cycloalkyl, substituted methyl; and n is 0 or 1. The invention also relates to the preparation and use of said dyes for coloring highly molecular organic and inorganic materials and to 9-amino-perylene-3,4-dicarboxylic acid imides (Va) as their intermediate products.

10 Claims, No Drawings

THERMOCHROMIC RYLENE DYES

The present invention relates to novel rylene dyes of the general formula I

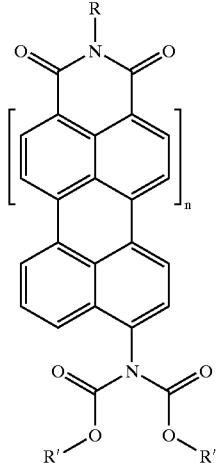

where

R is hydrogen or $C_1$–$C_{30}$-alkyl, whose carbon chain may be interrupted by one or more —O—, —S—, —$NR^1$—, —CO— and/or —$SO_2$— groups and which may be monosubstituted or polysubstituted by cyano, $C_1$–$C_6$-alkoxy, aryl, which may be substituted by $C_1$–$C_{18}$-alkyl or $C_1$–$C_6$-alkoxy, or a 5- to 7-membered heterocyclic radical which is bonded via a nitrogen atom and may contain further heteroatoms and may be aromatic; $C_5$–$C_8$-cycloalkyl, whose carbon skeleton may be interrupted by one or more —O—, —S— and/or —$NR^1$— groups and which may be monosubstituted or polysubstituted by $C_1$–$C_6$-alkyl; aryl or hetaryl, each of which may be monosubstituted or polysubstituted by $C_1$–$C_{18}$-alkyl, $C_1$–$C_6$-alkoxy, cyano, —$CONHR^2$, —$NHCOR^2$ and/or aryl- or hetarylazo, each of which may be substituted by $C_1$–$C_{10}$-alkyl, $C_1$–$C_6$-alkoxy or cyano;

R' is $C_2$–$C_{30}$-alkyl, whose carbon chain may be interrupted by one or more —O— and/or —CO— groups and which may be monosubstituted or polysubstituted by cyano, $C_1$–$C_6$-alkoxy, $C_5$–$C_8$-cycloalkyl, whose carbon skeleton may be interrupted by one or more —O—, —S— and/or —$NR^1$— groups and which may be $C_1$–$C_6$-alkyl-substituted, aryl, which may be substituted by $C_1$–$C_{18}$-alkyl or $C_1$–$C_6$-alkoxy, or a 5- to 7-membered heterocyclic radical which is bonded via a nitrogen atom and which may contain further heteroatoms and which may be aromatic;

methyl, which is monosubstituted or disubstituted by aryl, hetaryl and/or $C_5$–$C_8$-cycloalkyl, each of which may be substituted by $C_1$–$C_{18}$-alkyl or $C_1$–$C_6$-alkoxy;

$C_5$–$C_8$-cycloalkyl, whose carbon skeleton may be interrupted by one or more —O—, —S— and/or —$NR^1$— groups and which may be monosubstituted or polysubstituted by $C_1$–$C_6$-alkyl;

$R^1$ is hydrogen or $C_1$–$C_6$-alkyl;

$R^2$ is hydrogen; $C_1$–$C_{18}$-alkyl; aryl or hetaryl, each of which may be substituted by $C_1$–$C_6$-alkyl, $C_1$–$C_6$-alkoxy or cyano; n is 0 or 1, and to the preparation of these dyes, and to their use for coloring high-molecular-weight organic and inorganic materials.

The present invention furthermore relates to the preparation of 9-bromoperylene-3,4-dicarboximides of the general formula IIIa and aminorylenedicarboximides of the general formula V, and to novel 9-aminoperylene-3,4-dicarboximides of the general formula Va

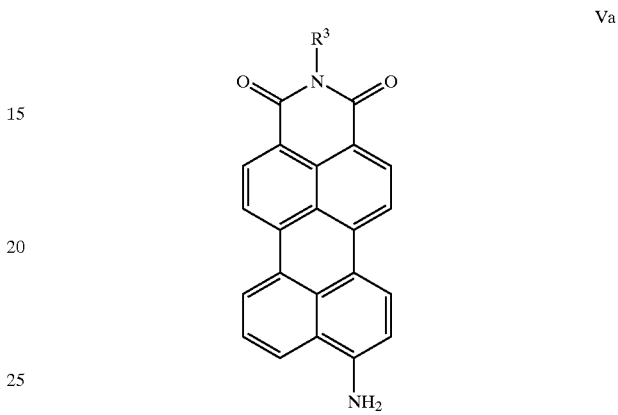

where:

$R^3$ hydrogen or $C_1$–$C_{30}$-alkyl, whose carbon chain may be interrupted by one or more —O—, —S—, —$NR^1$—, —CO— and/or —$SO_2$— groups and which may be monosubstituted or polysubstituted by cyano, $C_1$–$C_6$-alkoxy, aryl, which may be substituted by $C_1$–$C_{18}$-alkyl or $C_1$–$C_6$-alkoxy, or a 5- to 7-membered heterocyclic radical which is bonded via a nitrogen atom and may contain further heteroatoms and may be aromatic; $C_5$–$C_8$-cycloalkyl, whose carbon skeleton may be interrupted by one or more —O—, —S— and/or —$NR^1$— groups and which may be monosubstituted or polysubstituted by $C_1$–$C_6$-alkyl; aryl or hetaryl, each of which may be monosubstituted or polysubstituted by $C_1$–$C_{18}$-alkyl, $C_1$–$C_6$-alkoxy, cyano, —$CONHR^2$, —$NHCOR^2$ and/or aryl- or hetarylazo, each of which may be substituted by $C_1$–$C_{10}$-alkyl, $C_1$–$C_6$-alkoxy or cyano, where $R^1$ is hydrogen or $C_1$–$C_6$-alkyl;

$R^2$ is hydrogen $C_1$–$C_{18}$-alkyl; aryl or hetaryl, each of which may be substituted by $C_1$–$C_6$-alkyl, $C_1$–$C_6$-alkoxy or cyano;

as intermediates for the rylene dyes (I).

Perylene-3,4-dicarboximides which are substituted on the imide nitrogen atom, unsubstituted perylene-3,4-dicarboximide and perylene-3,4-dicarboximides which are substituted on the perylene skeleton are suitable not only as pigment precursors, but are themselves also advantageously employed as pigments and fluorescent dyes. The perylene-3,4-dicarboximides substituted on the perylene skeleton which have been disclosed hitherto are substituted in the 1,6-, 1,7-, 1,6,9-, 1,7,9- and 1,6,7,12-position and also only in the 9-position. The perylene skeleton in each case carries a halogen atom, in particular a bromine atom, in the 9-position (WO-A-96/22331, EP-A-596 292 and WO-A-97/

22607 and the references cited therein, and Dyes and Pigments 16, pages 19–25 (1991)). EP-A-657 436 and Liebigs Annalen 1995, pages 1229–1244, also describe an N-(1-hexylheptyl)-9-aminoperylene-3,4-dicarboximide which is prepared by nitrating the corresponding N-substituted perylene-3,4-dicarboximide using dinitrogen tetraoxide followed by reduction with metallic iron in the presence of hydrochloric acid. However, this process is restricted to perylene-3,4-dicarboximides carrying unsubstituted alkyl groups on the imide nitrogen atom and gives exclusively isomer mixtures (1- and 9-isomers), which are difficult to purify, in low yields. Corresponding N-substituted 4-aminonaphthalene-1,8-dicarboximides are disclosed in Yuki Gosei Kagaku Kyokaishi 12, pages 504–508 (1956) (see Chemical Abstracts 51:8052a (1957)).

EP-A-648 817 describes fluorescent dyes containing imide groups whose imide nitrogen atom, for reversible solubilization, has been converted into a carbamate function, which renders the dye soluble in the application medium and can be re-cleaved thermally. Inter alia, unsubstituted perylene-3,4-dicarboximide whose NH function is reacted correspondingly is also listed here as fluorescent dye. Since the solubilization takes place via the imide nitrogen atom there is no possibility of modifying the dye on the nitrogen atom by specific substitution. In addition, the hue of the dye does not change on thermal removal of the alkoxycarbonyl protecting group, and the dye is therefore not thermochromic.

It is an object of the present invention to provide further dyes having advantageous applicational properties which can in particular not only be incorporated readily into the respective application medium and matched to this medium, but are also thermochromic.

We have found that this object is achieved by the rylene dyes of the formula I defined at the outset.

Preferred rylene dyes are given in the subclaim.

We have also found a process for the preparation of the rylene dyes of the general formula I which comprises a) regioselectively monobrominating a perylene-3,4-dicarboximide of the general formula IIa

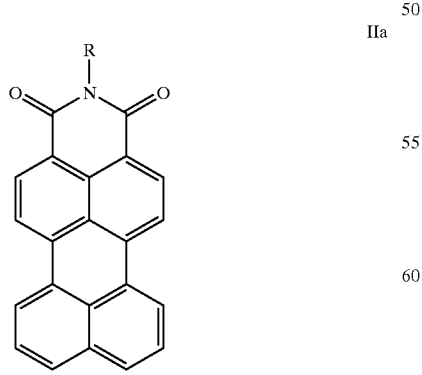

IIa using elemental bromine in the presence of an aliphatic monocarboxylic acid, b1) reacting the 9-bromoperylene-3,4-dicarboximide of the general formula IIIa

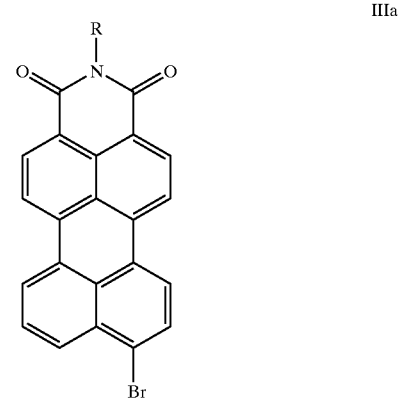

IIIa formed in step a) or a 4-bromonaphthalene-1,8-dicarboximide of the general formula IIIb

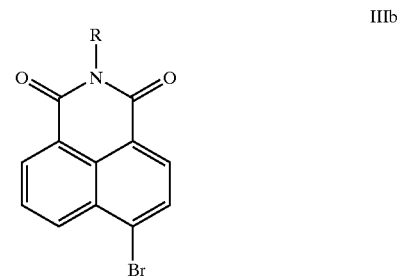

IIIb prepared in a known manner by imidation of 4-bromonaphthalene-1,8-dicarboxylic anhydride with a benzophenonimine of the general formula IV

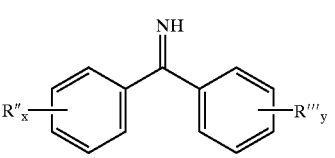

IV where

R″, R‴, independently of one another, are hydrogen, $C_1$–$C_6$-alkyl or $C_1$–$C_6$-alkoxy and x, y, independently of one another, are an integer from 1 to 3, in the presence of an aprotic organic solvent, a transition-metal catalyst system and a base in an aryl-N coupling reaction and b2) hydrolyzing the resultant ketimine in the presence of an acid and in the presence of a polar, aprotic solvent to give an aminorylenedicarboximide of the general formula V

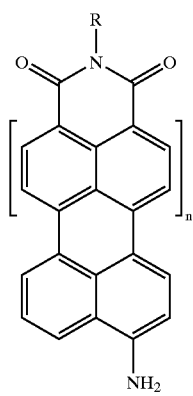

and c) subsequently reacting the latter with a dicarbonate of the general formula VI

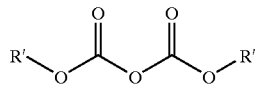

in the presence of a polar, aprotic solvent and in the presence of a base to give the rylene dye I.

We have also found a process for the preparation of aminorylenedicarboximides of the general formula V, which comprises reacting a bromorylenedicarboximide of the general formula III with a benzophenonimine of the general formula IV in the presence of an aprotic organic solvent, a transition-metal catalyst system and a base in an aryl-N coupling reaction to give the corresponding ketimine, and subsequently hydrolyzing the latter in the presence of an acid and in the presence of a polar, aprotic solvent.

In addition, we have found the 9-aminoperylene-3,4-dicarboximides of the formula Va defined at the outset as intermediates for the rylene dyes of the general formula I.

We have also found a process for the preparation of the 9-bromoperylene-3,4-dicarboximides of the general formula IIIa which comprises reacting a perylene-3,4-dicarboximide of the general formula IIa with elemental bromine in the presence of an aliphatic monocarboxylic acid.

Not least, we have found the use of the rylene dyes of the general formula I for coloring high-molecular-weight organic and inorganic materials.

All the alkyl groups which occur in the formulae I to VI can be either straight-chain or branched. If the alkyl groups are substituted, they generally carry 1 or 2 substituents. Substituted aromatic radicals can generally have up to 3, preferably 1 or 2, of said substituents. Preferred aryl radicals are naphthyl and in particular phenyl.

Examples which may be mentioned of suitable radials R, R', R", R''', $R^1$, $R^2$ and $R^3$ (and their substituents) are detailed below:

methyl, ethyl, propyl, isopropyl, butyl, isobutyl, tert-butyl, pentyl, isopentyl, neopentyl, tert-pentyl, hexyl, 2-methylpentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl (the above names isooctyl, isononyl, isodecyl and isotridecyl are trivial names and originate from the alcohols obtained in the oxosynthesis);

2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- and 3- butoxypropyl, 2- and 4-methoxybutyl, 2- and 4-ethoxybutyl, 2- and 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- and 4-butoxybutyl, 4,8-dioxadecyl, 3,6,9-trioxadecyl, 3,6,9-trioxaundecyl, 3,6,9-trioxadodecyl, 3,6,9,12-tetraoxatridecyl and 3,6,9,12-tetraoxatetradecyl;

2-methylthioethyl, 2-ethylthioethyl, 2-propylthioethyl, 2-isopropylthioethyl, 2-butylthioethyl, 2- and 3-methylthiopropyl, 2- and 3-ethylthiopropyl, 2- and 3-propylthiopropyl, 2- and 3- butylthiopropyl, 2- and 4-methylthiobutyl, 2- and 4-ethylthiobutyl, 2- and 4-propylthiobutyl, 3,6-dithiaheptyl, 3,6-dithiaoctyl, 4,8-dithianonyl, 3,7-dithiaoctyl, 3,7-dithianonyl, 4,7-dithiaoctyl, 4,7-dithianonyl, 2- and 4-butylthiobutyl, 4,8-dithiadecyl, 3,6,9-trithiadecyl, 3,6,9-trithiaundecyl, 3,6,9-trithiadodecyl, 3,6,9,12-tetrathiatridecyl and 3,6,9,12-tetrathiatetradecyl;

2-monomethyl- and 2-monoethylaminoethyl, 2-dimethylaminoethyl, 2- and 3-dimethylaminopropyl, 3-monoisopropylaminopropyl, 2- and 4-monopropylaminobutyl, 2- and 4-dimethylaminobutyl, 6-methyl-3,6-diazaheptyl, 3,6-dimethyl-3,6-diazaheptyl, 6-diazaoctyl, 3,6-dimethyl-3,6-diazaoctyl, 9-methyl-3,6,9-triazadecyl, 3,6,9-trimethyl-3,6,9-triazaundecyl, 12-methyl-3,6,9,12-tetraazatridecyl and 3,6,9,12-tetramethyl-3,6,9,12-tetraazatridecyl;

propan-2-on-1-yl, butan-3-on-1-yl, butan-3-on-2-yl and 2-ethylpentan-3-on-1-yl;

2-methylsulfonylethyl, 2-ethylsulfonylethyl, 2-propylsulfonylethyl, 2-isopropylsulfonylethyl, 2-butylsulfonylethyl, 2- and 3-methylsulfonylpropyl, 2- and 3-ethylsulfonylpropyl, 2- and 3-propylsulfonylpropyl, 2- and 3-butylsulfonylpropyl, 2- and 4-methylsulfonylbutyl, 2- and 4-ethylsulfonylbutyl, 2- and 4-propylsulfonylbutyl and 4-butylsulfonylbutyl;

2-cyanoethyl, 3-cyanopropyl, 2-methyl-3-ethyl-3-cyanopropyl, 7-cyano-7-ethylheptyl and 4-methyl-7-methyl-7-cyanoheptyl;

methoxy, ethoxy, propoxy, isopropoxy, butoxy, isobutoxy, sec-butoxy, tert-butoxy, pentoxy, isopentoxy, neopentoxy, tert-pentoxy and hexoxy;

carbamoyl, methylaminocarbonyl, ethylaminocarbonyl, propylaminocarbonyl, butylaminocarbonyl, pentylaminocarbonyl, hexylaminocarbonyl, heptylaminocarbonyl, octylaminocarbonyl, nonylaminocarbonyl, decylaminocarbonyl and phenylaminocarbonyl;

formylamino, acetylamino, propionylamino and benzoylamino;

phenylazo, 2-naphthylazo, 2-pyridylazo and 2-pyrimidylazo;

cyclopentyl, 2- and 3-methylcyclopentyl, 2- and 3-ethylcyclopentyl, cyclohexyl, 2-, 3- and 4-methylcyclohexyl, 2-, 3- and 4-ethylcyclohexyl, 3- and 4-propylcyclohexyl, 3- and 4-isopropylcyclohexyl, 3- and 4-butylcyclohexyl, 3- and 4-sec-butylcyclohexyl, 3- and 4-tert-butylcyclohexyl, cycloheptyl, 2-, 3- and 4-methylcycloheptyl, 2-, 3- and 4-ethylcycloheptyl, 3- and 4-propylcycloheptyl, 3- and 4-isopropylcycloheptyl, 3- and 4-butylcycloheptyl, 3- and 4-sec-butylcycloheptyl, 3- and 4-tert-butylcycloheptyl, cyclooctyl, 2-, 3-, 4- and 5-methylcyclooctyl, 2-, 3-, 4- and 5-ethylcyclooctyl, 3-, 4- and 5-propylcyclooctyl, 2-dioxanyl, 4-morpholinyl, 2- and 3-tetrahydrofuryl, 1-, 2- and 3-pyrrolidinyl and 1-, 2-, 3- and 4-piperidyl;

phenyl, 2-naphthyl, 2- and 3-pyrryl, 2-, 3- and 4-pyridyl, 2-, 4- and 5-pyrimidyl, 3-, 4- and 5-pyrazolyl, 2-, 4- and 5-imidazolyl, 2-, 4- and 5-thiazolyl, 3-(1,2,4-triazyl), 2-(1,3,5-triazyl), 6-quinaldyl, 3-, 5-, 6- and 8-quinolinyl, 2-benzoxazolyl, 2-benzothiazolyl, 5-benzothiadiazolyl, 2- and 5-benzimidazolyl and 1- and 5-isoquinolyl;

2-, 3- and 4-methylphenyl, 2,4-, 3,5- and 2,6-dimethylphenyl, 2,4,6-trimethylphenyl, 2-, 3- and 4-ethylphenyl, 2,4-, 3,5- and 2,6-diethylphenyl, 2,4,6-triethylphenyl, 2-, 3- and 4-propylphenyl, 2,4-, 3,5- and 2,6-dipropylphenyl, 2,4,6-tripropylphenyl, 2-, 3- and 4-isopropylphenyl, 2,4-, 3,5- and 2,6-diisopropylphenyl, 2,4,6-triisopropylphenyl, 2-, 3- and 4-butylphenyl, 2,4-, 3,5- and 2,6-dibutylphenyl, 2,4,6-tributylphenyl, 2-, 3- and 4-isobutylphenyl, 2,4-, 3,5- and 2,6-diisobutylphenyl, 2,4,6-triisobutylphenyl, 2-, 3- and 4-sec-butylphenyl, 2,4-, 3,5- and 2,6-di-sec-butylphenyl and 2,4,6-tri-sec-butylphenyl; 2, 3- and 4-methoxyphenyl, 2,4-, 3,5- and 2,6-dimethoxyphenyl, 2,4,6-trimethoxyphenyl, 2,3- and 4-ethoxyphenyl, 2,4-, 3,5- and 2,6-diethoxyphenyl, 2,4,6-triethoxyphenyl, 2,3- and 4-propoxyphenyl, 2,4-, 3,5- and 2,6-dipropoxyphenyl, 2,3- and 4-isopropoxyphenyl, 2,4-, 3,5- and 2,6-diisopropoxyphenyl and 2,3- and 4-butoxyphenyl; 2-, 3- and 4-cyanophenyl; 3- and 4-carboxyamidophenyl, 3- and 4-N-methylcarboxamidophenyl; 3- and 4-acetylaminophenyl, 3- and 4-propionylaminophenyl and 3- and 4-buturylaminophenyl; 3- and 4-N-phenylaminophenyl, 3- and 4-N-(o-tolyl)aminophenyl, 3- and 4-N-(m-tolyl)aminophenyl and 3- and 4-N-(p-tolyl)aminophenyl; 3- and 4-(2-pyridyl)aminophenyl, 3- and 4-(3-pyridyl)aminophenyl, 3- and 4-(4-pyridyl)aminophenyl, 3- and 4-(2-pyrimidyl)aminophenyl and 4-(4-pyrimidyl)aminophenyl;

4-phenylazophenyl, 4-(1-napthylazo)phenyl, 4-(2-naphthylazo)phenyl, 4-(4-naphthylazo)phenyl, 4-(2-pyridylazo)phenyl, 4-(3-pyridylazo)phenyl, 4-(4-pyridylazo)phenyl, 4-(4-pyrimidylazo)phenyl and 4-(5-pyrimidylazo)phenyl.

The rylene dyes of the general formula I can advantageously be prepared by the multistep process according to the invention, in which, in step a) a perylene-3,4-dicarboximide of the general formula IIa is regioselectively monobrominated, in step b1), the resultant 9-bromoperylene-3,4-dicarboximide of the general formula IIIa or the corresponding 4-bromonaphthalene-1,8-dicarboximide of the general formula IIIb obtained in a known manner by imidation of 4-bromonaphthalene-1,8-dicarboxylic anhydride is reacted with a benzophenonimine of the general formula IV to give a ketimine, in step b2), the ketimine is hydrolyzed under acidic conditions to give the aminorylenedicarboximide of the general formula V, and the latter is subsequently reacted, in step c), with a dicarbonate of the formula VI to give the rylene dye of the general formula I.

Step a) of the process according to the invention, the bromination of the perylene-3,4-dicarboximide of the general formula IIa in the 9-position using elemental bromine, is carried out in the presence of an aliphatic monocarboxylic acid as solvent and, if desired, in the presence of iodine as catalyst.

Particularly suitable here are $C_1$–$C_4$-carboxylic acids, such as formic acid, acetic acid, propionic acid, butyric acid and mixtures thereof.

From 5 to 30 kg, preferably from 15 to 25 kg, of carboxylic acid are usually used per kg of (IIa).

In general, the presence of a halogenating catalyst is not necessary. However, if it is desired to accelerate the bromination reaction (for example by a factor of 1.5 to 2), it is advisable to add elemental iodine, preferably in an amount of from 1 to 5 mol %, based on (IIa).

The molar ratio between bromine and (IIa) is usually from about 1:1 to 5:1, preferably from 3:1 to 4:1.

The reaction temperature is generally from 0 to 50° C., preferably from 15 to 40° C.

Depending on the reactivity of the perylene-3,4-dicarboximide of the general formula IIa and the presence or absence of iodine, the bromination is usually complete in from 2 to 12 hours.

An advantageous technical procedure in step a) is as follows:

The perylene-3,4-dicarboximide (IIa) and monocarboxylic acid are initially introduced, the mixture is adjusted to the desired reaction temperature over the course of 15 to 30 minutes with stirring, any catalyst to be used and subsequently, over the course of 5 to 10 minutes, the desired amount of bromine are added, and the mixture is stirred at the reaction temperature for from 2 to 12 hours with exclusion of light. After removal of excess bromine by means of a vigorous stream of nitrogen, the reaction mixture is introduced into the approximately equal amount of an aliphatic alcohol, such as methanol, and stirred overnight, and the precipitated product is filtered off, washed, preferably with the same alcohol, and dried at about 120° C. under reduced pressure.

In general, the 9-bromoperylene-3,4-dicarboximide of the general formula IIIa obtained in step a) already has such high purity (>98%) that it can be used directly for the subsequent reaction.

In step b1) of the process according to the invention, the 9-bromoperylene-3,4-dicarboximide of the general formula IIIa or the corresponding 4-bromonaphthalene-1,8-dicarboximide of the general formula IIIb, which is obtainable, analogously to the procedure described in Dyes and Pigments 22, pages 191–198 (1993), by imidation of 4-bromonaphthalene-1,8-dicarboxylic acid is reacted in an aryl-N coupling reaction with a benzophenonimine of the general formula IV in the presence of an aprotic organic solvent, a transition-metal catalyst system and a base to give a ketimine, which is subsequently hydrolyzed in step b2) in the presence of a polar, aprotic solvent and an acid to give an aminorylenedicarboximide of the general formula V.

Suitable benzophenonimines of the general formula IV for the ketimine formation in step b1) are, in particular, benzophenonimine, 4,4'-dimethyl- and 4,4'-diethylbenzophenonimine, 2,2', 4,4'-tetramethylbenzophenonimine and 4,4'-dimethoxy- and 4,4'-diethoxybenzophenonimine, benzophenonimine itself being preferred.

In general, from 1 to 4 mol, preferably from 1.5 to 2.5 mol, of (IV) are employed per mole of (IIIa) of (IIIb).

Particularly suitable aprotic organic solvents in step b1) are anhydrous, inert, aromatic solvents, such as benzene and its alkylation products, for example toluene and o-, m- and p-xylene, and mixtures of these compounds.

The amount of solvent is usually from 30 to 200 kg, preferably from 80 to 150 kg, per kg of (IIIa) or (IIIb).

Particularly suitable transition-metal catalysts are palladium compounds, where palladium(0) and palladium(II) complexes, such as tris(dibenzylideneacetone)dipalladium (0), dichloro[1,1'-bis(diphenylphosphino)ferrocene] palladium(II) and dichloro(1,5-cyclooctadiene)palladium (II), and palladium(II) acetate may be mentioned as preferred examples.

The transition-metal catalyst is usually employed in an amount of from 0.5 to 5 mol %, especially from 1 to 3 mol %, based on (IIIa) or (IIIb).

In addition, a phosphine-based cocatalyst is preferably employed. Preferred examples thereof are bidentate phosphine ligands, such as racemic 2,2'-bis(diphenylphosphino)-1,1'-binaphthyl, 1,1'-bis(diphenylphosphino)ferrocene, 1,1'-bis(di-o-tolylphosphino)ferrocene, 1,1',-bis(di-p-methoxyphenylphosphino)ferrocene and 2,2'-bis(di-o-tolylphosphino)-diphenylether, and phosphines which act as monodentate phosphine ligands, such as tri-o-tolylphosphine, tri-tert-butylphosphine and triphenylphosphine.

Suitable amounts of cocatalyst are generally from 1 to 5 mol %, preferably from 1 to 3 mol %, based on the transition-metal catalyst.

Particularly suitable bases are alkali metal amides, especially alkali metal di($C_3$–$C_6$-alkyl)amides, and alkali metal alkoxides, especially the alkali metal salts of secondary and tertiary aliphatic ($C_3$–$C_6$)-alcohols. Preferred examples of these bases are lithium diisopropylamide, sodium diisopropylamide and potassium diisopropylamide, and lithium isopropoxide, sodium iospropoxide, potassium isopropoxide, lithium tert-butoxide, sodium tert-butoxide and potassium tert-butoxide, particular preference being given to sodium tert-butoxide and potassium tert-butoxide.

In general, an amount of base which his equimolar to the benzophenonimine of the general formula IV is employed.

The reaction temperature is usually from 50 to 120° C., preferably from 70 to 100° C.

Depending on the reactivity of the brominated rylene dicarboximide of the general formula IIIa or IIIb and the amount of catalyst employed, the reaction time is generally from 6 to 20 hours.

An advantageous technical procedure in step b1) is the following:

The solvent, catalyst and cocatalyst are initially introduced under a protective-gas atmosphere, the bromorylenedicarboximide of the general formula IIIa or IIIb, the benzophenonimine of the general formula IV and the base are added successively with stirring, and the mixture is heated at the desired reaction temperature under a protective gas for from 6 to 20 hours. After the mixture has been cooled to room temperature, the solid constituents are filtered off, and the solvent is removed by distillation under reduced pressure.

The purity of the resultant ketimine is generally adequate for further processing. If desired, the crude product can be purified further by re-precipitation from a mixture of chloroform or methylene chloride and petroleum ether or by column chromatography on silica gel using chloroform as eluent.

The hydrolysis of the ketimine in step b2) is carried out in the presence of a polar, aprotic solvent. Preferred solvents are aliphatic ethers, where acrylic ethers, such as, in particular, di ($C_2$–$C_4$-alkyl) ethers and $C_2$–$C_3$-alkyleneglycol di-$C_1$–$C_2$-alkylethers, and cyclic ethers are suitable. The following particularly preferred ethers may be mentioned by way of example: diethylether, dipropylether, dibutylether, ethylene glycol dimethyl and diethyl ether, tetrahydrofuran and dioxane.

In general, from 50 to 300 kg, preferably from 70 to 200 kg, of solvent are employed per kg of ketamine.

The hydrolysis is preferably carried out using an inorganic acid, such as hydrochloric acid, sulfuric acid, phosphoric acid or nitric acid.

From 3 to 6 kg of a 2 to 4 normal aqueous solution of the acid are usually employed per kg of ketimine.

The reaction temperature is generally from 10 to 50° C., preferably from 20 to 35° C.

The hydrolysis is generally complete in from 0.5 to 2 hours.

An advantageous technical procedure in step b2) is the following:

The ketimine is dissolved in the solvent with stirring, the mixture is brought to the desired reaction temperature, the aqueous acid is added and the mixture is stirred at this temperature for from 0.5 to 2 hours. The remaining acid is subsequently neutralized, for example using concentrated aqueous ammonia and the solvent is removed by distillation under reduced pressure.

The following procedure can then be used for further work-up of the reaction product:

The residue is suspended in an excess of dilute aqueous base (for example ammonia water) and filtered off, the filter material is, if desired, stirred repeatedly in a 30- to 50-fold amount of hot aqueous base (for example semiconcentrated aqueous ammonia) and again filtered off, and the filter material is washed with water until neutral and dried at 100° C. under reduced pressure. In order to remove benzophenone and further organic impurities, the dried crude product is subsequently extracted with petroleum ether.

Step c) of the process according to the invention, the reaction of the aminorylenedicarboximide of the general formula V with a dicarbonate of the general formula VI to give the rylene dye of the general formula I is carried out in the presence of a polar, aprotic solvent with base catalysis.

Particularly preferred dicarbonates of the general formula VI are dialkyl carbonates, especially di($C_2$–$C_8$-alkyl) dicarbonates, such as diethyl dicarbonate, dipropyl dicarbonate, diisopropyl dicarbonate, di-n-butyl dicarbonate, di-sec-butyl dicarbonate, di-tert-butyl dicarbonate, di-tert-pentyl dicarbonate and bis(2-ethylhexyl) dicarbonate, dicycloalkyl dicarbonates, especially di($C_5$–$C_8$-cycloalkyl) dicarbonates, such as dicyclopentyl dicarbonate, dicyclohexyl dicarbonate and dicycloheptyl dicarbonate, dicycloalkylalkyl dicarbonates, such as bis(1- and 2-cyclohexylethyl) dicarbonate and bis(1,2- and 3-cyclohexylpropyl) dicarbonate, diaralkyl dicarbonates, especially diphenyl-$C_1$–$C_4$-alkyl dicarbonates, such as dibenzyl dicarbonate, bis(1- and 2-phenylethyl) dicarbonate and bis(1-, 2- and 3-phenylpropyl) dicarbonate, and diphenyldicycloalkyl-$C_1$–$C_4$-alkyl dicarbonates, such as bis (1- and 2-cyclohexyl-2-phenyl) dicarbonate, bis(1-, 2- and 3-cyclohexyl-2-phenyl) dicarbonate and bis(1-, 2- and 3-cyclohexyl-3-phenyl) dicarbonate.

In general, from 2 to 5 mol, preferably from 3 to 4 mol of (VI) are employed per mole of (V).

Particularly suitable polar, aprotic solvents are the ethers mentioned for step b2), which are advantageously used in anhydrous (dried) form.

The amount of solvent is usually from 50 to 300 kg, preferably from 80 to 200 kg, per kg of (V).

Particularly suitable bases are nitrogen bases, especially tertiary aliphatic amines, preferably tri($C_1$–$C_4$-alkyl)amines, whose alkyl radicals may be identical or different and which are preferably used in combination with dialkylamino-substituted pyridines. Very particular preference is given to combinations of tri($C_2$–$C_4$-alkyl)amines, such as triethylamine, diisopropylethylamine and tributylamine, with 4-(N,N-dimethylamino)pyridine in a molar ratio of from 4:1 to 1:1, in particular of about 2:1.

In general, from 5 to 20 mol %, preferably about 10 mol % of base, based on (VI), are employed.

The reaction temperature is generally from 20 to 70° C., preferably from 35 to 50° C.

The reaction time is usually form 2 to 12 hours.

An advantageous technical procedure in step c) is the following:

the solvents, the aminorylene dicarboximide of general formula V and the base are initially introduced under a protective-gas atmosphere, the dicarbonate of the general formula VI is added, and the mixture is stirred at the desired reaction temperature under a protective gas for from 2 to 12 hours. In order to work up the rylene dye of the general formula I, from about 70 to 80% by vol. of the solvent are subsequently removed by distillation under reduced pressure, a 2- to 4-fold amount of an aliphatic alcohol, for example methanol, is slowly added, and the precipitation of the rylene dye of the general formula I is completed by cooling to from 3 to 6° C., and the dye of the general formula I is filtered off and dried at 100° C. under reduced pressure.

The purity of the resultant rylene dyes of the general formula I is generally >97% and is generally adequate for use. For particular requirements, the purity can be increased by recrystallization from a halogenated hydrocarbon, such as methylenechloride or chloroform, or an aromatic solvent, such as benzene, toluene or xylene, or by column chromatography on silica gel using chloroform as eluent.

The process according to the invention enables the preparation of the rylene dyes of the general formula I and their intermediates in an advantageous economical manner. The purity of the products obtained in the individual process steps is generally >95% without further purification, and the yield of all process steps, in each case based on the rylene dicarboximide derivative employed, is generally >60% for perylenedicarboximide derivatives and >40% for naphthalenedicarboximide derivatives.

The rylene dyes of the general formula I according to the invention are highly suitable for homogeneous coloring of high-molecular-weight organic and inorganic materials, in particular, for example, plastics, especially thermoplastics, surface coatings and printing inks, and oxidic layer systems.

A particularly advantageous property of the rylene dyes of the general formula I according to the invention is their thermochromicity, i.e. the irreversible conversion of the dyes from a molecular species having a primary color A into a structurally different species having a secondary color B. The thermochromic effect is induced by warming the colored material to temperatures above the conversion temperature of the rylene dye of the general formula I. The primary and/or secondary color of the colored material can in addition be varied in a simple manner by employing rylene dyes of the general formula I according to the invention in the form of a mixture with one another and/or with conventional pigments and dyes.

The thermochromicity of the rylene dyes of the general formula I according to the invention can in addition advantageously be utilized for the production of laser-markable or laser-inscribable colorings. Through a suitable choice of the substituent R', the conversion temperature of the rylene dyes of the general formula I can be set in particular for this application, which was unexpected. Thus, the conversion temperatures of rylene dyes of the formula I according to the invention in which R' is primary or secondary alkyl or aralkyl are generally >280° C. These rylene dyes of the general formula I can be incorporated into classical thermoplastics (for example polystyrene, poly(acrylonitrile-butadiene-styrene), poly(styrene-acrylonitrile), polycarbonate or polymethyl methacrylate) in a conventional manner (for example by extrusion or injection molding) and used for industrial laser marking or inscription.

A laser-markable or laser-inscribable color can be produced using the rylene dyes of the general formula I according to the invention (or mixtures thereof with one another and with other colorants) in combination with one or more transparent or translucent, organic or inorganic (N)IR absorbers having, in particular, a neutral or only weak inherent color in the visible region which converts the incident (N)IR laser energy into the thermal energy needed for the thermochromic conversion.

For this purpose, conventional, commercially available (N)IR absorbers, for example those from the classes of the methines, azamethines, transition-metal dithiolenes, squaric acid derivatives, phthalocyanines, naphthalocyanines, amidinium and iminium salts and in particular quaterrylene derivatives can be used. For use together with semiconductor lasers, particular preference is given to absorbers having an absorption maximum at from 780 to 850 nm, and for use together with conventional Nd-YAG lasers, particular preference is given to absorbers having an absorption maximum at about 1064 nm, in each case having a gram absorptivity of at least 50 at the absorption maximum.

EXAMPLES

A) Preparation of Rylene Dyes of the Formula I According to the Invention a) Preparation of 9-Bromoperylene-3,4-dicarboximides of the Formula IIIa Examples 1 to 4

$x_1$ g (0.1 mol) of perylene-3,4-dicarboximide of the general formula IIa were suspended in $a_1$ l of glacial acetic acid for 30 minutes. 1 g (4 mmol) of iodine and 64 g (0.4 mol) of bromine were added, and the mixture was then stirred at $T_1$° C. for $t_1$ hours with exclusion of light.

The reaction mixture was subsequently freed from excess bromine by passing through a vigorous stream of nitrogen, then diluted with 1 l of methanol and stirred overnight at room temperature.

The precipitated product was filtered off, washed firstly with 1.5 l of methanol and then with water until the washings were neutral, and dried at 120° C. under reduced pressure.

Further details on these experiments and their results are shown in Table 1.

TABLE 1

| Ex. | $x_1$ [g] | Perylene-3,4-dicarboximide IIa | $a_1$ [l] | $t_1$ [h] | $T_1$ [°C.] | Yield [g]/[%] | Appearance | m. p. [°C.] |
|---|---|---|---|---|---|---|---|---|
| 1 | 48.8 | N-dodecylperylene-3,4-dicarboximide | 1 | 4.5 | 25 | 52.3/92 | red, amorphous | 231 |
| 2 | 41.4 | N-cyclohexylperylene-3,4-dicarboximide | 0.8 | 4.5 | 25 | 46.8/97 | red-orange amorphous | 254 |
| 3 | 48.1 | N-(2,6-diisopropylphenyl)perylene-3,4-dicarboximide | 1 | 4.5 | 25 | 52.0/93 | orange, microcrystalline | >350 |
| 4 | 43.5 | N-(4-methoxyphenyl)perylene-3,4-dicarboximide | 1 | 5 | 30 | 45.6/90 | red-orange, microcrystalline | >350 |

Analytical data for Example 1:
9-Bromo-N-dodecylperylene-3,4-dicarboximide: Elemental analysis (% by weight calc./found): C: 71.8/71.6; H: 6.0/6.0; N: 2.5/2.4; O: 5.6/5.7; Br: 14.0/14.2; Mass (FD, 8 kV): m/e=569.2 (M$^+$, 100%); $^1$H-NMR (500 MHz, C$_2$D$_2$Cl$_4$, 135° C.): δ=8.5–8.6 (m, 2H), 8.3–8.5 (m, 4H), 8.15 (d, 1H), 7.90 (d, 1H), 7.71 (t, 1H), 4.23 (t, 2H), 1.84 (m, 2H), 1.48 (m, 2H), 1.35 (bs, 16H), 0.94 (t, 3H) ppm; IR (KBr): ν=1694 (s, C=O), 1651 (s, C=O) cm$^{-1}$; UV/VIS (CHCl$_3$): λ$_{max}$ (ε)=480 (34689), 504 (32084) nm.

Analytical data for Example 2:
9-Bromo-N-cyclohexylperylene-3,4-dicarboximide: Elemental analysis (% by weight calc./found): C: 69.7/69.6; H: 4.2/4.2; N: 2.9/2.9; O: 6.6/6.6; Br: 16.6/16.7; Mass (FD, 8 kV): m/e=483.1 (M$^+$, 100%); IR (KBr): ν=1692 (s, C=O), 1652 (s, C=O) cm$^{-1}$; UV/VIS (CHCl$_3$): λ$_{max}$ (ε)=482 (35807), 505 (33991) nm.

Analytical data for Example 3:
9-Bromo-N-(2,6-diisopropylphenyl)perylene-3,4-dicarboximide: Elemental analysis (% by weight calc./found): C: 72.9/73.0; H: 4.7/4.7; N: 2.5/2.5; O: 5.7/5.8; Br: 14.3/14.1; Mass (FD, 8 kV): m/e=561.1 (M$^+$, 100%); $^1$H-NMR (300 MHz, CDCl$_3$): δ=8.64 (d, 1H), 8.62 (d, 1H), 8.45 (d, 1H), 8.42 (d, 1H), 8.37 (d, 1H), 8.27 (d, 1H), 8.20 (d, 1H), 7.87 (d, 1H), 7.69 (t, 1H), 7.47 (dd, 1H), 7.33 (d, 2H), 2.77 (m, 2H), 1.18 (d, 12H) ppm; IR (KBr): ν=1695 (s, C=O), 1653 (s, C=O) cm$^{-1}$; UV/VIS (CHCl$_3$): λ$_{max}$ (ε)=484 (34762), 509 (35319) nm.

Analytical data for Example 4:
9-Bromo-N-(4-methoxyphenyl)perylene-3,4-dicarboximide: Elemental analysis (% by weight calc./found): C: 68.8/68.9; H: 3.2/3.2; N: 2.8/2.8; O: 9.5/9.6; Br: 15.8/15.6; Mass (FD, 8 kV): m/e=507 (M$^+$, 100%); IR (KBr): ν=1698 (s, C=O), 1651 (s, C=O) cm$^{-1}$; UV/VIS (CHCl$_3$): λ$_{max}$ (ε)=486 (36103), 510 (36888) nm.

b) Preparation of Aminorylenedicarboximides of the Formula V

Examples 5 to 20

Sub-step I: Preparation of the Ketimines

Examples 5 to 12

A solution, stirred under a protective gas, of k mmol of the transition-metal catalyst tris(benzylideneacetone) dipalladium(0) and c μmol of the cocatalyst 2,2'-bis (diphenylphosphino)-1,1'-binaphthyl (racemate) in a$_2$ l of anhydrous toluene was heated at T$_2$° C. for t$_2$ h after addition of x$_2$ g (18 mmol) of the monobromorylenedicarboximide of the general formula III, 6.52 g (36 mmol) of benzophenonimine and 3.46 g of sodium tert-butoxide.

After the mixture had been cooled to room temperature, the insoluble constituents had been filtered off and the solvents had been removed by distillation under reduced pressure, the crude product was dissolved in as little chloroform as possible with gentle warming. After filtration, the product was re-precipitated by careful addition of a ten-fold amount of petroleum ether (boiling range 60–90° C.), filtered off and dried at 100° C. under reduced pressure.

Further details on these experiments and their results are shown in Table 2.

TABLE 2

| Ex. | $x_2$ [g] | Bromorylenedicarboximide III | k [mmol] | c [mmol] | $a_2$ [l] | $t_2$ [h] | $T_2$ [°C.] | Yield [g]/[%] | Appearance | Smp. [°C.] |
|---|---|---|---|---|---|---|---|---|---|---|
| 5 | 8.0 | 4-bromo-N-dodecyl-naphthalene-1,8-dicarboximide | 0.24 | 3.0 | 0.8 | 12 | 70 | 8.8/90 | pale yellow, amorphous | 277 |
| 6 | 6.45 | 4-bromo-N-cyclohexyl-naphthalene-1,8-dicarboximide | 0.24 | 3.0 | 0.8 | 12 | 70 | 7.8/95 | yellow, amorphous | 259 |
| 7 | 7.85 | 4-bromo-N-(2,6-diisopropylphenyl)-naphthalene-1,8-dicarboximide | 0.24 | 3.75 | 1 | 15 | 80 | 9.1/94 | yellow, microcrystalline | 292 |
| 8 | 6.9 | 4-bromo-N-(4-methoxyphenyl)-naphthalene-1,8-dicarboximide | 0.24 | 3.75 | 1 | 15 | 80 | 7.9/91 | yellow, crystalline | >300 |
| 9 | 10.2 | imide from Ex. 1 | 0.24 | 3.75 | 1.5 | 15 | 80 | 11.1/92 | violet, microcrystalline | 262 |
| 10 | 8.7 | imide from Ex. 2 | 0.24 | 3.75 | 1.2 | 15 | 80 | 10.3/98 | violet, amorphous | 248 |
| 11 | 10.0 | imide from Ex. 3 | 0.24 | 3.75 | 1.5 | 15 | 80 | 11.3/95 | dark violet, crystalline | 230 |
| 12 | 9.1 | imide from Ex. 4 | 0.24 | 4.5 | 1.4 | 15 | 80 | 10.1/93 | dark violet, crystalline | >300 |

Analytical data for Example 5:
4-(Diphenylmethyleneimino)-N-dodecylnaphthalene-1,8-dicarboximide: Elemental analysis (% by weight calc./found): C: 81.6/81.8; H: 7.4/7.3; N: 5.1/5.1; O: 5.9/5.8; Mass (FD, 8 kV): m/e=544.2 (M$^+$, 100%)

Analytical data for Example 6:
4-(Diphenylmethylenimino)-N-cyclohexylnaphthalene-1,8-dicarboximide: Elemental analysis (% by weight calc./found): C: 81.2/81.1; H: 5.7/5.7; N: 6.1/6.1; O: 7.0/7.1; Mass (FD, 8 kV): m/e 458.2 (M$^+$, 100%).

Analytical data for Example 7:
4-(Diphenylmethylenimino)-N-(2,6-diisopropylphenyl)-naphthalene-1,8-dicarboximide: Elemental analysis (% by weight calc./found): C: 82.8/82.6; H: 6.0/6.1; N: 5.2/5.2; O: 6.0/6.1; Mass (FD, 8 kV): m/e=536.2 (M$^+$, 100%); $^1$H-NMR (300 MHz, C$_2$D$_2$Cl$_4$, 120° C.): δ=8.57 (d, 1H), 8.40 (d, 1H), 8.30 (d, 1H), 7.68 (dd, 1H), 7.50 (m, 4H), 7.36 (m, 7H), 7.23 (d, 2H), 6.75 (d, 1H), 2.70 (m, 2H), 1.11 (d, 12H) ppm; IR (KBr): ν=1774 (s, C=O), 1735 (s, C=O) cm$^{-1}$; UV/VIS (CHCl$_3$): $\lambda_{max}$ (ε)=389 (19640) nm.

from benzophenone and other organic impurities and then dried at 100° C. under reduced pressure.

Further details on these experiments and their results are shown in table 3.

TABLE 3

| Ex. | x$_3$ [mmol] | Ketimine from Ex. | a$_3$ [l] | t$_3$ [h] | T$_3$ [° C.] | Yield [g]/[%] | Appearance | m. p. [° C.] |
|---|---|---|---|---|---|---|---|---|
| 13 | 18.4 | 5 | 2 | 0.75 | 25 | 4.55/65 | yellow-orange, amorphous | 261 |
| 14 | 21.8 | 6 | 2 | 0.75 | 25 | 5.00/78 | yellow, amorphous | 242 |
| 15 | 18.6 | 7 | 2 | 0.75 | 25 | 4.85/70 | yellow-orange microcrystalline, | >300 |
| 16 | 20.7 | 8 | 2 | 0.75 | 25 | 4.70/71 | orange, crystalline | >300 |
| 17 | 15.0 | 9 | 1 | 0.75 | 25 | 7.20/95 | dark blue, amorphous | 246 |
| 18 | 17.2 | 10 | 1 | 0.75 | 25 | 7.15/99 | blue-violet, amorphous | 230 |
| 19 | 15.1 | 11 | 1 | 0.75 | 25 | 7.30/98 | dark blue, microcrystalline | 212 |
| 20 | 16.5 | 12 | 1 | 0.75 | 25 | 7.00/96 | dark blue, crystalline | >300 |

Analytical data for Example 8:
4-(Diphenylmethylenimino)-N-(4-methoxyphenyl) naphthalene-1,8-dicarboximide: Elemental analysis (% by weight calc./found): C: 79.65/79.8; H: 4.6/4.6; N: 5.8/5.7; O: 9.95/9.9; Mass (FD, 8 kV): m/e=482.2 (M$^+$, 100%).

Analytical data for Example 9:
9-(Diphenylmethylenimino)-N-dodecylperylene-3,4-dicarboximide: Elemental analysis (% by weight calc./found): C: 84.4/84.2; H: 6.6/6.7; N: 4.2/4.2; O: 4.8/4.9; Mass (FD, 8 kV): m/e=668,3 (M$^+$, 100%)

Analytical data for Example 10:
9-(Diphenylmethylenimino)-N-cyclohexylperylene-3,4-dicarboximide Elemental analysis (% by weight calc./found): C: 84.5/84.1; H: 5.2/5.3; N: 4.8/4.9; O: 5.5/5.7; Mass (FD, 8 kV): m/e=582.2 (M$^+$, 100%).

Analytical data for Example 11:
9-(Diphenylmethylenimino)-N-(2,6-diisopropylphenyl) perylene-3,4-dicarboximide: Elemental analysis (% by weight calc./found): C: 85.4/85.1; H: 5.5/5.6; N: 4.25/4.2; O: 4.85/5.0; Mass (FD, 8 kV): m/e=660.3 (M$^+$, 100%). $^1$H-NMR (500 MHz, C$_2$D$_2$Cl$_4$, 140° C.): δ=8.63 (d, 1H), 8.57 (d, 1H), 8.50 (d, 1H), 8.44 (d, 1H), 8.26 (d, 1H), 8.22 (d, 1H), 8.20 (d, 1H), 7.66 (dd, 1H), 7.59 (m, 4H), 7.46 (t, 1H), 7.43 (m, 6H), 7.32 (d, 2H), 6.72 (d, 1H), 2.81 (m, 2H), 1.22 (d, 12H) ppm; IR (KBr): ν=1696 (s, C=O), 1657 (s, C=O) cm$^{-1}$; UV/VIS (NMP): $\lambda_{max}$ (ε)=535 (40480) nm.

Analytical data for Example 12:
9-(Diphenylmethylenimino)-N-(4-methoxyphenyl) perylene-3,4-dicarboximide: Elemental analysis (% by weight calc./found): C: 83.15/83.0; H: 4.3/4.3; N: 4.2/4.2; O: 4.8/4.9; Mass (FD, 8 kV): m/e=606.2 (M$^+$, 100%).

Sub-step II: Hydrolysis of the Ketimines to Give the Aminorylenedicarboximides of the Formula V Examples 13 to 20

A solution of 10 g (x$_3$ mmol) of the ketimine from Examples 5 to 12 in a$_3$ l of tetrahydrofuran was stirred at T$_3$° C. for t$_3$ hours after addition of 50 ml of 2 molar aqueous hydrochloric acid.

After the reaction mixture has been neutralized using concentrated ammonia and the solvent has been removed by distillation under reduced pressure, the residue was suspended in a mixture of 1 l of water and 50 ml of concentrated ammonia in order to remove inorganic impurities, filtered off, again suspended twice, with interim filtration, in 1 l of hot 20% strength aqueous ammonia each time and then filtered. After hot extraction with petroleum ether (boiling range 60–90° C.), the crude product was subsequently freed Analytical data for Example 13:
4-Amino-N-dodecylnaphthalene-1,8-dicarboximide: Elemental analysis (% by weight calc./found): C: 75.75/75.4; H: 8.5/8.6; N: 7.35/7.5; O: 8.4/8.5; Mass (FD, 8 kV): m/e=380.2 (M$^+$, 100%).

Analytical data for Example 14:
4-Amino-N-cyclohexylnaphthalene-1,8-dicarboximide: Elemental analysis (% by weight calc./found): C: 73.45/73.1; H: 6.15/6.2; N: 9.5/9.6; O: 10.9/11.1; Mass (FD, 8 kV): m/e=294.1 (M$^+$, 100%).

Analytical data for Example 15:
4-Amino-N-(2,6-diisopropylphenyl)naphthalene-1,8-dicarboximide: Elemental analysis (% by weight calc./found): C: 77.4/77.1; H: 6.5/6.6; N: 7.5/7.5; O: 8.6/8.8; Mass (FD, 8 kV): m/e=372.2 (M$^+$, 100%); $^1$H-NMR (300 MHz, DMSO-d$_6$, 25° C.): δ=8.69 (d, 1H), 8.46 (d, 1H), 8.23 (d, 1H), 7.68 (dd, 1H), 7.58 (s, 2H), 7.39 (t, 1H), 7.26 (d, 2H), 6.89 (d, 1H), 2.57 (m, 2H), 1.02 (d, 12H) ppm; IR (KBr): ν=1678 (m, C=O), 1635 (m, C=O) cm$^{-1}$; UV/VIS (CHCl$_3$): $\lambda_{max}$ (ε)=407 (11140) nm.

Analytical data for Example 16:
4-Amino-N-(4-methoxyphenyl)naphthalene-1,8-dicarboximide: Elemental analysis (% by weight calc./found): C: 71.7/71.4; H: 4.4/4.5; N: 8.8/8.8; O: 15.1/15.3; Mass (FD, 8 kV): m/e=318.1 (M$^+$, 100%).

Analytical data for Example 17:
9-Amino-N-dodecylperylene-3,4-dicarboximide: Elemental analysis (% by weight calc./found): C: 80.9/81.2; H: 7.2/7.1; N: 5.55/5.5; O: 6.35/6.2; Mass (FD, 8 kV): m/e=504.3 (M$^+$, 100%).

Analytical data for Example 18:
9-Amino-N-cyclohexylperylene-3,4-dicarboximide: Elemental analysis (% by weight calc./found): C: 80.35/80.6; H: 5.3/5.3; N: 6.7/6.6; O: 7.65/7.5; Mass (FD, 8 kV): m/e=418.2 (M$^+$, 100%).

Analytical data for Example 19:
9-Amino-N-(2,6-diisopropylphenyl)perylene-3,4-dicarboximide: Elemental analysis (% by weight calc./found): C: 82.2/81.9; H: 5.7/5.8; N: 5.65/5.55; O: 6.45/6.75; Mass (FD, 8 kV): m/e=496.2 (M$^+$, 100%); $^1$H-NMR (500 MHz, DMSO-d$_6$, 25° C.): δ=8.75 (d, 1H), 8.59 (d, 1H), 8.49 (d, 1H), 8.43 (d, 1H), 8.38 (d, 1H), 8.36 (d, 1H), 8.29 (d, 1H), 7.64 (dd, 1H), 7.42 (t, 1H), 7.31 (d, 2H), 7.14 (s, 2H), 6.91 (d, 1H), 2.62 (m, 2H), 1.08 (d, 12H) ppm; IR (KBr): ν=1686 (s, C=O), 1641 (s, C=O) cm$^{-1}$; UV/VIS (CHCl$_3$): $\lambda_{max}$ (ε)=561 (29070) nm.

Analytical data for Example 20:
9-Amino-N-(4-methoxyphenyl)perylene-3,4-dicarboximide: Elemental analysis (% by weight calc./found): C: 78.7/78.5; H: 4.1/4.1; N: 6.35/6.4; O: 10.85/11.0; Mass (FD, 8 kV): m/e=442.1 (M$^+$, 100%).

c) Preparation of Rylene Dyes of the Formula I

Examples 21 to 32

A solution, stirred under a protective gas, of 49 mg (0.4 mmol) of 4-(N,N-dimethylamino)pyridine, 408 mg (0.8 mmol) of triethylamine and $x_4$ g (2.02 mmol) of the aminorylene dicarboximide from Examples 13 to 20 in 100 ml of anhydrous tetrahydrofuran (examples 21 to 31) or dioxane (Example 32) was heated at $T_4$° C. for $t_4$ hours after addition of y g (8 mmol) of the dicarbonate of the formula VI.

After 80% by vol. of the solvent had been removed by the distillation under reduced pressure, the precipitation of the product was completed by slow addition of 50 ml of methanol and cooling to from 3 to 6° C. The precipitated product was filtered off, washed with methanol and dried at 100° C. under reduced pressure.

The melting points of all rylene dyes of the formula I obtained were above the thermal conversion temperature (elimination of $CO_2$ and alkene or aralkene).

Further details on these experiments and their results are shown in Table 4.

Analytical data for Example 21:
4-(Diethoxycarbonyl)amino-N-dodecylnaphthalene-1,8-dicarboximide: Elemental analysis (% by weight calc./found): C: 68.7/68.4; H: 7.7/7.7; N: 5.35/5.4; O: 18.3/18.5; Mass (MALDI-TOF): m/e=524.5 ($M^+$, 100%); IR (KBr): $\nu$=1627 (s), 1564 (s), 1543 (s), 1508 (s) $cm^{-1}$; UV/VIS ($CHCl_3$): $\lambda_{max}$ ($\epsilon$)=345 (16 541), 360 (14001) nm.

Analytical data for Example 22:
4-(Diethoxycarbonyl)amino-N-cyclohexylnaphthalene-1,8-dicarboximide: Elemental analysis (% by weight calc./found): C: 65.75/65.5; H: 6.0/6.0; N: 6.4/6.5; O: 21.9/22.1; Mass (MALDI-TOF): m/e=438.4 ($M^+$, 100%); IR (KBr): $\nu$=1628 (s), 1564 (s), 1542 (s), 1507 (s) UV/VIS ($CHCl_3$): $\lambda_{max}$ ($\epsilon$)=346 (16 900), 358 (14807) nm.

Analytical data for Example 23:
4-(Diethoxycarbonyl)amino-N-(2,6-diisopropylphenyl)naphthalene-1,8-dicarboximide: Elemental analysis (% by weight calc./found): C: 69.75/69.5; H: 6.25/6.3; N: 5.4/5.4; O: 18.6/18.8; Mass (MALDI-TOF): m/e=516.5 ($M^+$, 100%); $^1$H-NMR (300 MHz, $C_2D_2Cl_4$, 25° C.): $\delta$=8.59 (d, 1H), 8.56 (d, 1H), 8.17 (d, 1H), 7.79 (dd, 1H), 7.61 (d, 1H), 7.39 (t, 1H), 7.26 (d, 2H), 4.14 (q, 4H), 2.60 (m, 2H), 1.07 (m, 18H) ppm; IR (KBr): $\nu$=1624 (s), 1562 (s), 1544 (s), 1510 (s) $cm^{-1}$; UV/VIS ($CHCl_3$): $\lambda_{max}$ ($\epsilon$)=342 (15760), 358 (13411) nm.

Analytical data for Example 24:
4-(Di-sec-butoxycarbonyl)amino-N-(2,6-diisopropylphenyl)naphthalene-1,8-dicarboximide (isomer mixture): Elemental analysis (% by weight calc./found): C: 71.3/70.9; H: 7.05/7.15; N: 4.9/5.0; O: 16.75/16.95; Mass (MALDI-TOF): m/e=572.6 ($M^+$, 100%); $^1$H-NMR (300 MHz, $C_2D_2Cl_4$, 25° C.): $\delta$=8.58 (d, 1H), 8.56 (d, 1H), 8.15 (d, 1H), 7.80 (dd, 1H), 7.61 (d, 1H), 7.40 (t, 1H), 7.24 (d, 2H), 4.76 (m, 2H), 2.63 (m, 2H), 1.40 (m, 2H), 1.33 (m, 2H), 1.12 (d, 3H), 1.09 (d, 12H), 1.05 (d, 3H) ppm; IR (KBr): $\nu$=1623 (s), 1561 (s), 1544 (s), 1508 (s) $cm^{-1}$; UV/VIS ($CHCl_3$): $\lambda_{max}$ ($\epsilon$)=340 (15511), 354 (13300) nm.

Analytical data for Example 25:
4-(Di-tert-butoxycarbonyl)amino-N-(2,6-diisopropylphenyl)naphthalene-1,8-dicarboximide: Elemental analysis (% by weight calc./found): C: 71.3/71.1; H: 7.05/7.1; N: 4.9/4.9; O: 16.75/16.9; Mass (MALDI-TOF): m/e=572.7 ($M^+$, 100%); $^1$H-NMR (300 MHz, $C_2D_2Cl_4$, 25° C.): $\delta$=8.58 (d, 1H), 8.57 (d, 1H), 8.15 (d, 1H), 7.79 (dd, 1H), 7.62 (d, 1H), 7.39 (t, 1H), 7.24 (d, 2H), 2.62 (m, 2H), 1.39 (s, 18H), 1.05 (d, 12H) ppm; IR (KBr): $\nu$=1623 (s), 1560 (s), 1542 (s), 1509 (s) $cm^{-1}$; UV/VIS ($CHCl_3$): $\lambda_{max}$ ($\epsilon$)=340 (15420), 352 (13260) nm.

Analytical data for Example 26:
4-(Di-tert-butoxycarbonyl)amino-N-(4-methoxyphenyl)naphthalene-1,8-dicarboximide: Elemental analysis (% by weight calc./found): C: 67.2/66.9; H: 5.8/5.9; N: 5.4/5.4; O: 21.6/21.8; Mass (MALDI-TOF): m/e=518.5 ($M^+$, 100%); IR (KBr): $\nu$=1625 (s), 1558 (s), 1540 (s), 1511 (s) $cm^{-1}$; UV/VIS ($CHCl_3$): $\lambda_{max}$ ($\epsilon$)=341 (16005), 355 (13360) nm.

Analytical data for Example 27:
9-(Diethoxycarbonyl)amino-N-dodecylperylene-3,4-dicarboximide: Elemental analysis (% by weight calc./found): C: 74.05/73.8; H: 6.85/6.9; N: 4.3/4.3; O: 14.8/15.0; Mass (MALDI-TOF): m/e=648.5 ($M^+$, 100%); IR (KBr): $\nu$=1700 (s, C=O), 1666 (s, C=O), 1501 (s) $cm^{-1}$; UV/VIS ($CHCl_3$): $\lambda_{max}$ ($\epsilon$)=484 (35940), 510 (37010) nm.

Analytical data for Example 28:
9-(Di-sec-butoxycarbonyl)amino-N-cyclohexylperylene-3,4-dicarboximide: Elemental analysis (% by weight calc./found): C: 73.8/73.5; H: 6.2/6.3; N: 4.5/4.55; O: 15.5/15.65; Mass (MALDI-TOF): m/e=618.4 ($M^+$, 100%); IR (KBr): $\nu$=1698 (s, C=O), 1667 (s, C=O) $cm^{-1}$; UV/VIS ($CHCl_3$): $\lambda_{max}$ ($\epsilon$)=485 (36170), 511 (37030) nm.

Analytical data for Example 29:
9-(Diethoxycarbonyl)amino-N-(2,6-diisopropylphenyl)perylene-3,4-dicarboximide: Elemental analysis (% by weight calc./found): C: 75.0/74.8; H: 5.65/5.65; N: 4.35/4.25; O: 15.0/15.3; Mass (MALDI-TOF): m/e=640.3 ($M^+$, 100%); $^1$H-NMR (500 MHz, $C_2D_2Cl_4$, 25° C.): $\delta$=8.52 (d, 2H), 8.51 (d, 1H), 8.39 (m, 3H), 8.35 (d, 1H), 7.78 (d, 1H), 7.64 (dd, 1H), 7.46 (d, 1H), 7.39 (t, 1H), 7.25 (d, 2H), 4.16 (d, 4H), 2.65 (m, 2H), 1.09 (m, 18H) ppm; IR (KBr): $\nu$=1702 (s, C=O), 1664 (s, C=O), 1502 (s) $cm^{-1}$; UV/VIS ($CHCl_3$): $\lambda_{max}$ ($\epsilon$)=481 (36780), 507 (37620) nm.

TABLE 4

| Ex. | $x_4$ [g] | Aminorylene-dicarboximide V from Ex. | y [g] | Dicarbonate VI | $t_4$ [h] | $T_4$ [° C.] | Yield [g]/[%] | Appearance |
|---|---|---|---|---|---|---|---|---|
| 21 | 0.77 | 13 | 1.3 | Diethyl dicarbonate | 10 | 45 | 0.76/72 | pale yellow, microcrystalline |
| 22 | 0.59 | 14 | 1.3 | Diethyl dicarbonate | 10 | 45 | 0.71/80 | pale yellow, microcrystalline |
| 23 | 0.75 | 15 | 1.3 | Diethyl dicarbonate | 10 | 45 | 0.81/78 | pale yellow microcrystalline |
| 24 | 0.75 | 15 | 1.75 | Di-sec-butyl dicarbonate | 10 | 45 | 0.95/82 | colorless, amorphous |
| 25 | 0.75 | 15 | 1.75 | Di-tert-butyl dicarbonate | 10 | 45 | 0.94/81 | colorless, amorphous |
| 26 | 0.64 | 16 | 1.75 | Di-tert-butyl dicarbonate | 10 | 45 | 0.84/80 | colorless, amorphous |
| 27 | 1.02 | 17 | 1.3 | Diethyl dicarbonate | 6 | 45 | 1.02/78 | orange, microcrystalline |
| 28 | 0.85 | 18 | 1.75 | Di-sec-butyl dicarbonate | 6 | 45 | 0.94/75 | orange, microcrystalline |
| 29 | 1.00 | 19 | 1.3 | Diethyl dicarbonate | 6 | 45 | 1.05/81 | orange, microcrystalline |
| 30 | 1.00 | 19 | 1.75 | Di-sec-butyl dicarbonate | 6 | 45 | 1.08/77 | orange, microcrystalline |
| 31 | 1.00 | 19 | 1.75 | Di-tert-butyl dicarbonate | 6 | 45 | 1.07/76 | orange, microcrystalline |
| 32 | 0.89 | 20 | 1.75 | Di-tert-butyl dicaronate | 6 | 60 | 1.04/80 | orange, crystalline |

Analytical data for Example 30:

9-(Di-sec-butoxycarbonyl)amino-N-(2,6-diisopropylphenyl)perylene-3,4-dicarboximide: Elemental analysis (% by weight calc./found): C: 75.85/75.5; H: 6.35/6.4; N: 4.0/4.0; O: 13.8/14.1; Mass (MALDI-TOF): m/e= 696.3 (M$^+$, 100%) $^1$H-NMR (500 MHz, C$_2$D$_2$Cl$_4$, 25° C.): δ=8.55 (d, 1H), 8.54 (d, 1H), 8.40 (m, 4H), 7.80 (d, 1H), 7.64 (dd, 1H), 7.45 (d, 1H), 7.39 (t, 1H), 7.25 (d, 2H), 4.78 (m, 2H), 2.65 (m, 2H), 1.38 (m, 2H), 1.31 (m, 2H), 1.13 (d, 3H), 1.09 (d, 12H), 1.04 (d, 3H), 0.70 (t, 3H), 0.52 (t, 3H) ppm; IR (KBr): ν=1702 (s, C=O), 1665 (s, C=O) cm$^{-1}$; UV/VIS (CHCl$_3$): λ$_{max}$ (ε)=483 (36500), 509 (36780) nm.

Analytical data for Example 31:

9-(Di-tert-butoxycarbonyl)amino-N-(2,6-diisopropylphenyl)perylene-3,4-dicarboximide: Elemental analysis (% by weight calc./found): C: 75.85/75.6; H: 6.35/6.4; N: 4.0/3.95; O: 13.8/14.05; Mass (MALDI-TOF): m/e= 696.3 (M$^+$, 100%); $^1$H-NMR (500 MHz, C$_2$D$_2$Cl$_4$, 25° C.): δ=8.54 (d, 2H), 8.41 (M, 4H), 7.81 (d, 1H), 7.65 (dd, 1H), 7.40 (d, 2H), 7.24 (d, 2H), 2.64 (m, 2H), 1.29 (m, 18H), 1.08 (d, 12H) ppm; IR (KBr): ν=1750 (s, C=O), 1703 (s, C=O), 1665 (s, C=O), 1592 (s, C=O) cm$^{-1}$; UV/VIS (CHCl$_3$): λ$_{max}$ (ε)=485 (37500), 507 (37430) nm.

Analytical data for Example 32:

9-(Di-tert-butoxycarbonyl)amino-N-(4-methoxyphenyl)perylene-3,4-dicarboximide: Elemental analysis (% by weight calc./found): C: 72.9/72.6; H: 5.3/5.4; N: 4.35/4.4; O: 17.45/17.6; Mass (MALDI-TOF): m/e=642.3 (M$^+$, 100%); IR (KBr): ν=1747 (s, C=O), 1701 (s, C=O), 1666 (s, C=O), 1590 (s, C=O) cm$^{-1}$; UV/VIS (CHCl$_3$): λ$_{max}$ (ε)=483 (37950), 506 (37330) nm.

B) Use of Rylene Dyes of the Formula I According to the Invention a) Preparation of High-molecular-weight Materials with a Thermochromic Coloring.

Examples 33 to 47

For the preparation of thermoplastics with a thermochromic coloring, in each case x g of the dye of the formula I and, if desired, z g of the transparent pigment P were mixed with 100 g of one of the matrix polymers PS: Polystyrene 144C crystal clear (BASF)
PMMA: Polymethyl methacrylate molding composition 7N crystal clear (Röhm) or
PC: Polycarbonate Makrolon® 2858 (Bayer) and converted into a semi-finished product in a conventional manner by extrusion and injection molding.

In order to produce thermochromic surface coatings, a mixture of in each case x g of the dye of the formula I and 100 g of a solvent-based alkyd-melamine baking enamel (45% by weight of solids content) was shaken with 150 g of glass beads (diameter 3 mm) for 30 minutes in a Skandex instrument, then applied to metal sheeting using a knife coater and baked for 30 minutes at 130° C. (film thickness in the dried state 55±5 μm).

The thermochromic color change (primary color→secondary color) of the colored polymeric systems was induced by heating for 15 minutes at the respective conversion temperature T° C.

Further details on these experiments and their results are shown in Table 5.

TABLE 5

| Ex. | x [g] | Rylene dye I from Ex. | z [g] | Pigment P | Polymeric system | Primary color | Secondary color | T [° C.] |
|---|---|---|---|---|---|---|---|---|
| 33 | 0.2 | 23 | — | — | PS | colorless | yellow-orange | 340 |
| 34 | 0.2 | 23 | — | — | PMMA | colorless | yellow-orange | 360 |
| 35 | 0.2 | 23 | — | — | PC | colorless | yellow-orange | 360 |
| 36 | 0.2 | 24 | — | — | PS | colorless | yellow-orange | 300 |
| 37 | 0.2 | 25 | — | — | PS | colorless | yellow-orange | 220 |
| 38 | 5 | 25 | — | — | surface coating | colorless | yellow-orange | 190 |
| 39 | 0.2 | 29 | — | — | PS | orange | blue-violet | 340 |
| 40 | 0.2 | 29 | — | — | PMMA | orange | blue-violet | 360 |
| 41 | 0.2 | 29 | — | — | PC | orange | blue-violet | 370 |
| 42 | 0.2 | 30 | — | — | PS | orange | blue-violet | 310 |
| 43 | 0.2 | 31 | — | — | PS | orange | blue-violet | 220 |
| 44 | 5 | 31 | — | — | surface coating | orange | blue-violet | 190 |
| 45 | 0.225 0.075 | 23 29 | — | — | PS | orange | red-brown | 340 |
| 46 | 0.21 | 23 | 0.09 | C. I. Pigment Red 149 (Paliogen ® Red K 3580) | PS | red | orange | 340 |
| 47 | 0.21 | 23 | 0.09 | C. I. Pigment Blue 15:3 (Heliogen ® Blue K 7090) | PS | blue | green | 340 | b) Production of Laser-markable or Laser-inscribable Colorings

Examples 48 to 51

In order to produce laser-markable or laser-inscribable colorings, the dyes from Examples 34 or 40 were incorporated into PMMA as described under a), but with addition of y g of the (near) infrared absorber A.

The colored semi-finished product was subsequently marked using an Nd-YAG laser (emission wavelength of 1064 nm, nominal laser power 40 watts; scanning rate 1000 mm/s; Examples 48 and 50) or with a semiconductor laser diode (emission wavelength of 780 nm, nominal laser power 1 watt, scanning rate 100 mm/s; Examples 49 and 51).

Further details on these experiments and their results are shown in Table 6.

TABLE 6

| Ex. | Dye I from Ex. | y [g] | (N)IR absorber A | Color of the mark | Background color |
|---|---|---|---|---|---|
| 48 | 34 | 0.01 | (N)IR-Senzitizing Dye IR 1060-1 (methine dye; Esprit Inc.) | yellow-orange | pale yellow |
| 49 | 34 | 0.005 | (N)IR-Senzitizing Dye IR 800-1 (cyanine dye; Esprit Inc.) | yellow-orange | pale gray |
| 50 | 40 | 0.01 | (N)IR-Senzitizing Dye IR 1060-1 (methine dye; Esprit Inc.) | blue-violet | orange |
| 51 | 40 | 0.01 | N,N'-bis (2,6-diisopropylphenyl) quaterrylene-3,4:13,14-tetracarboxylic diimide | blue-violet | orange |

We claim:

1. A thermochromic rylene dye of formula I

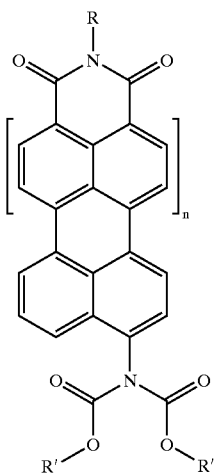

where

R is hydrogen or $C_1$–$C_{30}$-alkyl, whose carbon chain may be interrupted by one or more —O—, —S—, —$NR^1$—, —CO— and/or —$SO_2$— groups and which may be monosubstituted or polysubstituted by cyano, $C_1$–$C_6$-alkoxy, aryl, which may be substituted by $C_1$–$C_{18}$-alkyl or $C_1$–$C_6$-alkoxy, or a 5- to 7-membered heterocyclic radical which is bonded via a nitrogen atom and may contain further heteroatoms and may be aromatic;

$C_5$–$C_8$-cycloalkyl, whose carbon skeleton may be interrupted by one or more —O—, —S— and/or —$NR^1$— groups and which may be monosubstituted or polysubstituted by $C_1$–$C_6$-alkyl;

aryl or hetaryl, each of which may be monosubstituted or polysubstituted by $C_1$–$C_{18}$-alkyl, $C_1$–$C_6$-alkoxy, cyano, —$CONHR^2$, —$NHCOR^2$ and/or aryl- or hetarylazo, each of which may be substituted by $C_1$–$C_{10}$-alkyl, $C_1$–$C_6$-alkoxy or cyano, where R' is $C_2$–$C_{30}$-alkyl, whose carbon chain may be interrupted by one or more —O— and/or —CO— groups and which may be monosubstituted or polysubstituted by cyano, $C_1$–$C_6$-alkoxy, $C_5$–$C_8$-cycloalkyl, whose carbon skeleton may be interrupted by one or more —O—, —S— and/or —$NR^1$— groups and which may be $C_1$–$C_6$-alkyl-substituted, aryl, which may be substituted by $C_1$–$C_{18}$-alkyl or $C_1$–$C_6$-alkoxy, or a 5- to 7-membered heterocyclic radical which is bonded via a nitrogen atom and which may contain further heteroatoms and which may be aromatic;

methyl, which is monosubstituted or disubstituted by aryl, hetaryl and/or $C_5$–$C_8$-cycloalkyl, each of which may be substituted by $C_1$–$C_{18}$-alkyl or $C_1$–$C_6$-alkoxy;

$C_5$–$C_8$-cycloalkyl, whose carbon skeleton may be interrupted by one or more —O—, —S— and/or —$NR^1$— groups and which may be monosubstituted or polysubstituted by $C_1$–$C_6$-alkyl;

$R^1$ is hydrogen or $C_1$–$C_6$-alkyl;

$R^2$ is hydrogen; $C_1$–$C_{18}$-alkyl; aryl or hetaryl, each of which may be substituted by $C_1$–$C_6$-alkyl, $C_1$–$C_6$-alkoxy or cyano;

n is 0 or 1.

2. The rylene dye of formula I as claimed in claim 1, where R is hydrogen or $C_1$–$C_{30}$-alkyl, whose carbon chain may be interrupted by one or more —O— and/or —CO— groups which may be monosubstituted or polysubstituted by cyano, $C_1$–$C_6$-alkoxy, aryl, which may be substituted by $C_1$–$C_{18}$-alkyl or $C_1$–$C_6$-alkoxy, or a 5- to 7-membered heterocyclic radical which is bonded via a nitrogen atom and may contain further heteroatoms and may be aromatic;

$C_5$–$C_8$-cycloalkyl, whose carbon skeleton may be interrupted by one or more —O— and/or —$NR^1$— groups and which may be monosubstituted or polysubstituted by $C_1$–$C_6$-alkyl; aryl or hetaryl, each of which may be monosubstituted or polysubstituted by $C_1$–$C_{18}$-alkyl, $C_1$–$C_6$-alkoxy, cyano, —$CONHR^2$ or —$NHCOR^2$;

R' is $C_2$–$C_{30}$-alkyl, whose carbon chain may be interrupted by one or more —O— and/or —C— groups and which may be monosubstituted or polysubstituted by $C_1$–$C_6$-alkoxy, $C_5$–$C_8$-cycloalkyl, whose carbon skeleton may be interrupted by one or more —O— and/or —$NR^1$— groups and which may be $C_1$–$C_6$-alkyl-substituted, or aryl, which may be substituted by $C_1$–$C_{18}$-alkyl or $C_1$–$C_6$-alkoxy; methyl, which is monosubstituted or disubstituted by aryl and/or $C_5$–$C_8$-cycloalkyl, each of which may be substituted by $C_1$–$C_{18}$-alkyl or $C_1$–$C_6$-alkoxy; $C_5$–$C_8$-cycloalkyl, whose carbon skeleton may be interrupted by one or more —O— and/or —$NR^1$— groups and which may be monosubstituted or polysubstituted by $C_1$–$C_6$-alkyl.

3. The rylene dye of formula I as claimed in claim 1, where R is hydrogen or $C_1$–$C_{30}$-alkyl, whose carbon chain may be interrupted by one or more —O— and/or —CO— groups which may be monosubstituted or polysubstituted by $C_1$–$C_6$-alkoxy or aryl, which may be substituted by $C_1$–$C_{18}$-alkyl or $C_1$–$C_6$-alkoxy; $C_5$–$C_8$-cycloalkyl which may be monosubstituted or polysubstituted by $C_1$–$C_6$-alkyl; aryl, which may be monosubstituted or polysubstituted by $C_1$–$C_{18}$-alkyl, $C_1$–$C_6$-alkoxy or cyano;

R' is $C_2$–$C_{30}$-alkyl, whose carbon chain may be interrupted by one or more —O— groups and which may be monosubstituted or polysubstituted by $C_1$–$C_6$-alkoxy, $C_5-C_8$-cycloalkyl which may be $C_1-C_6$-alkyl-substituted, or aryl, which may be substituted by $C_1-C_{18}$-alkyl or $C_1-C_6$-alkoxy;

methyl, which is monosubstituted or disubstituted by aryl and/or $C_5-C_8$-cycloalkyl, each of which may be substituted by $C_1-C_{18}$-alkyl or $C_1-C_6$-alkoxy; $C_5-C_8$-cycloalkyl, which may be monosubstituted or polysubstituted by $C_1-C_6$-alkyl.

4. A process for the preparation of a rylene dye of formula I as claimed in claim 1, which comprises
a) regioselectively monobrominating a perylene-3,4-dicarboximide of formula IIa

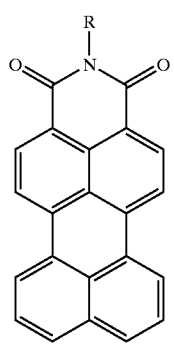

IIa using elemental bromine in the presence of an aliphatic monocarboxylic acid, b1) reacting the 9-bromoperylene-3,4-dicarboximide of formula IIIa

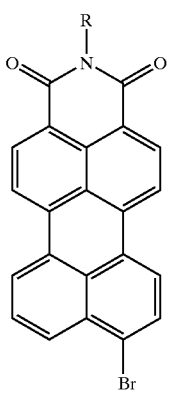

IIIa formed in step a) or a 4-bromonaphthalene-1,8-dicarboximide of formula IIIb

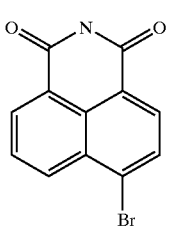

IIIb prepared by imidation of 4-bromonaphthalene-1,8-dicarboxylic anhydride with a benzophenonimine of formula IV

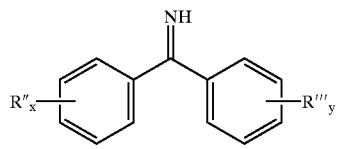

IV where

R″, R‴, independently of one another, are hydrogen, $C_1-C_6$-alkyl or $C_1-C_6$-alkoxy and x, y, independently of one another, are an integer from 1 to 3, in the presence of an aprotic organic solvent, a transition-metal catalyst system and a base in an aryl-N coupling reaction and b2) hydrolysing the resultant ketimine in the presence of an acid and in the presence of a polar, aprotic solvent to give an aminorylenedicarboximide of formula V

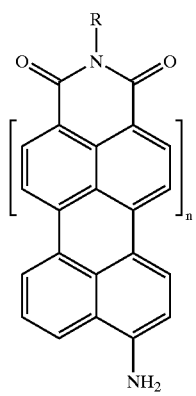

V and c) subsequently reacting the latter with a dicarbonate of formula VI

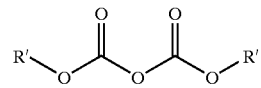

VI in the presence of a polar, aprotic solvent and in the presence of a base to give a rylene dye I.

5. A process for the preparation of an aminorylenedicarboximide of formula V

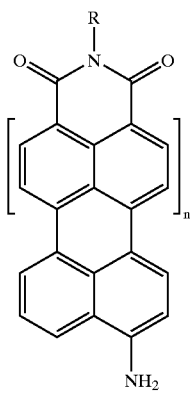

where
- R is hydrogen or $C_1$–$C_{30}$-alkyl, whose carbon chain may be interrupted by one or more —O—, —S—, —$NR^1$—, —CO— and/or —$SO_2$— groups and which may be monosubstituted or polysubstituted by cyano, $C_1$–$C_6$-alkoxy, aryl, which may be substituted by $C_1$–$C_{18}$-alkyl or $C_1$–$C_6$-alkoxy, or a 5- to 7-membered heterocyclic radical which is bonded via a nitrogen atom and may contain further heteroatoms and may be aromatic; $C_5$–$C_8$-cycloalkyl, whose carbon skeleton may be interrupted by one or more —O—, —S— and/or —$NR^1$— groups and which may be monosubstituted or polysubstituted by $C_1$–$C_6$-alkyl; aryl or hetaryl, each of which may be monosubstituted or polysubstituted by $C_1$–$C_{18}$-alkyl, $C_1$–$C_6$-alkoxy, cyano, —$CONHR^2$, —$NHCOR^2$ and/or aryl- or hetarylazo, each of which may be substituted by $C_1$–$C_{10}$-alkyl, $C_1$–$C_6$-alkoxy or cyano;
- $R^1$ is hydrogen or $C_1$–$C_6$-alkyl;
- $R^2$ is hydrogen; $C_1$–$C_{18}$-alkyl; aryl or hetaryl, each of which may be substituted by $C_1$–$C_6$-alkyl, $C_1$–$C_6$-alkoxy or cyano;
- n is 0 or 1, which comprises reacting a bromorylenedicarboximide of formula III

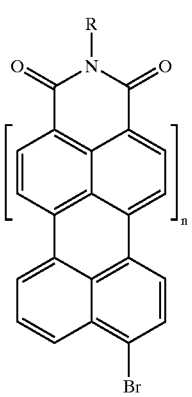

with a benzophenonimine of formula IV

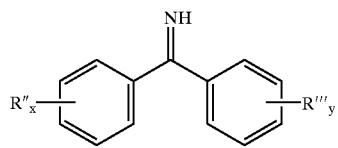

in the presence of an aprotic organic solvent, a transition-metal catalyst system and a base in an aryl-N coupling reaction, and hydrolysing the resultant ketimine in the presence of an acid and in the presence of a polar, aprotic solvent.

6. A 9-aminoperylene-3,4-dicarboximide of formula Va where
- $R^3$ is hydrogen or $C_1$–$C_{30}$-alkyl, whose carbon chain may be interrupted by one or more —O—, —S—, —$NR^1$—, —CO— and/or —$SO_2$— groups and which may be monosubstituted or polysubstituted by cyano, $C_1$–$C_6$-alkoxy, aryl, which may be substituted by $C_1$–$C_{18}$-alkyl or $C_1$–$C_6$-alkoxy, or a 5- to 7-membered heterocyclic radical which is bonded via a nitrogen atom and may contain further heteroatoms and may be aromatic;

$C_5$–$C_8$-cycloalkyl, whose carbon skeleton may be interrupted by one or more —O—, —S— and/or —$NR^1$— groups and which may be monosubstituted or polysubstituted by $C_1$–$C_6$-alkyl; aryl or hetaryl, each of which may be monosubstituted or polysubstituted by $C_1$–$C_{18}$-alkyl, $C_1$–$C_6$-alkoxy, cyano, —$CONHR^2$, —$NHCOR^2$ and/or aryl- or hetarylazo, which may be substituted by $C_1$–$C_{10}$-alkyl, $C_1$–$C_6$-alkyl or cyano;

- $R^1$ is hydrogen or $C_1$–$C_6$-alkyl;
- $R^2$ is hydrogen, $C_1$–$C_{18}$-alkyl; aryl or hetaryl, each of which may be substituted by $C_1$–$C_6$-alkyl, $C_1$–$C_6$-alkoxy or cyano.

7. A process for the preparation of 9-bromoperylene-3,4-dicarboximide of formula IIIa IIIa

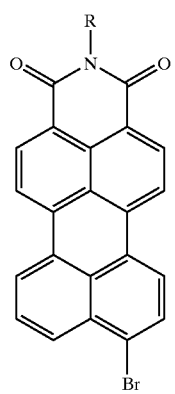

where

R is hydrogen or $C_1$–$C_{30}$-alkyl, whose carbon chain may be interrupted by one or more —O—, —S—, —$NR^1$—, —CO— and/or —$SO_2$— groups and which may be monosubstituted or polysubstituted by cyano, $C_1$–$C_6$-alkoxy, aryl, which may be substituted by $C_1$–$C_{18}$-alkyl or $C_1$–$C_6$-alkoxy, or a 5- to 7-membered heterocyclic radical which is bonded via a nitrogen atom and may contain further heteroatoms and may be aromatic; $C_5$–$C_8$-cycloalkyl, whose carbon skeleton may be interrupted by one or more —O—, —S— and/or —$NR^1$— groups and which may be monosubstituted or polysubstituted by $C_1$–$C_6$-alkyl; aryl or hetaryl, each of which may be monosubstituted or polysubstituted by $C_1$–$C_{18}$-alkyl, $C_1$–$C_6$-alkoxy, cyano, —$CONHR^2$, —$NHCOR^2$ and/or aryl- or hetarylazo, which may be substituted by $C_1$–$C_{10}$-alkyl, $C_1$–$C_6$-alkoxy or cyano;

$R^1$ is hydrogen or $C_1$–$C_6$-alkyl;

$R^2$ is hydrogen; $C_1$–$C_{18}$-alkyl; aryl or hetaryl, each of which may be substituted by $C_1$–$C_6$-alkyl, $C_1$–$C_6$-alkoxy or cyano, which comprises reacting a perylene-3,4-dicarboximide of formula IIa

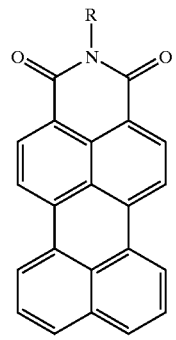

IIa with elemental bromine in the presence of an aliphatic monocarboxylic acid.

8. A process for coloring high-molecular-weight organic and inorganic materials, said process comprising adding the rylene dye of formula I as claimed in claim 1 to said high-molecular-weight organic material or said inorganic material.

9. The process as claimed in claim 8, wherein said high-molecular-weight-organic material and said inorganic material is selected from the group consisting of plastics, surface coatings, printing inks and oxidic layer systems.

10. The process as claimed in claim 8, wherein a laser markable or laser inscrible coloring is produced.

* * * * *